United States Patent
Tanaka (10) Patent No.: US 7,747,967 B2
(45) Date of Patent: Jun. 29, 2010

(54) DIFFERENTIAL TREE AND DIALOG DEVICE SETTINGS MENU

(75) Inventor: Tomoyuki Tanaka, Concord, CA (US)

(73) Assignees: Kyocera Mita Corporation, Osaka-shi (JP); Kyocera Technology Development, Inc., Concord, CA (US)

(*) Notice: Subject to any disclaimer, the term of this patent is extended or adjusted under 35 U.S.C. 154(b) by 590 days.

(21) Appl. No.: 10/972,262

(22) Filed: Oct. 21, 2004

(65) Prior Publication Data

US 2006/0090143 A1    Apr. 27, 2006

(51) Int. Cl.
*G06F 3/048* (2006.01)
*G06F 3/00* (2006.01)

(52) U.S. Cl. .................. 715/821; 715/710; 715/772; 715/789

(58) Field of Classification Search .......... 715/777, 715/744, 764, 736, 789, 810–825, 840
See application file for complete search history.

(56) References Cited

U.S. PATENT DOCUMENTS

| | | | |
|---|---|---|---|
| 5,604,860 A | | 2/1997 | McLaughlin |
| 5,751,922 A | * | 5/1998 | Harada ............... 358/1.13 |
| 5,774,570 A | * | 6/1998 | Toju et al. ............ 382/112 |
| 6,121,968 A | | 9/2000 | Arcuri |
| 6,407,760 B1 | | 6/2002 | Aritomi |
| 6,424,429 B1 | * | 7/2002 | Takahashi et al. ....... 358/1.16 |
| 6,515,684 B1 | * | 2/2003 | Knodt ................. 715/777 |
| 6,535,229 B1 | | 3/2003 | Kraft |
| 6,574,002 B1 | | 6/2003 | Paczewitz |
| 6,614,454 B1 | | 9/2003 | Livingston |
| 6,621,532 B1 | | 9/2003 | Mandt |
| 6,625,503 B1 | | 9/2003 | Smith |
| 6,661,437 B1 | | 12/2003 | Miller |
| 6,684,260 B1 | | 1/2004 | Foster |
| 7,057,747 B1 | * | 6/2006 | Minagawa ............ 358/1.13 |
| 7,196,676 B2 | * | 3/2007 | Nakamura et al. ........ 345/1.1 |
| 2001/0002128 A1 | | 5/2001 | Takayama |
| 2001/0026288 A1 | * | 10/2001 | Shima ................. 345/764 |
| 2002/0047866 A1 | | 4/2002 | Matsumoto |
| 2002/0054146 A1 | | 5/2002 | Fukumoto |
| 2002/0070977 A1 | | 6/2002 | Morcos |
| 2003/0020760 A1 | | 1/2003 | Takatsu |

(Continued)

OTHER PUBLICATIONS

Dell, Using Network Manager to Deploy Firmware and Backup/Restore Configuration Files Nov. 17, 2003.*

(Continued)

*Primary Examiner*—Weilun Lo
*Assistant Examiner*—Nicholas Augustine (57) ABSTRACT

A method for providing a simplified menu for a device, by providing a GUI for selecting setting items for display and setting values. Those settings that are different from the standard settings are displayed more prominently, resulting in a display that enables an instantaneous confirmation of the settings. Clicking on tabs to display different menu pages is unnecessary. Those settings that are the same as the standard settings are displayed less conspicuously, such as grayed-out or invisible. Methods include displaying the custom settings as the first tab in the menu, indicating that all the settings are standard, customizing factory-default settings of a printer device, assigning profile names, searching for a profile close to the current settings, differential tree that expands only the branches containing salient settings, associating a setting with another setting, and using a scripting language to specify the setting combinations.

19 Claims, 7 Drawing Sheets

U.S. PATENT DOCUMENTS

| | | | |
|---|---|---|---|
| 2003/0030664 A1* | 2/2003 | Parry | 345/744 |
| 2003/0035001 A1 | 2/2003 | Van Geest | |
| 2003/0043208 A1 | 3/2003 | Staelin | |
| 2003/0048309 A1 | 3/2003 | Tambata | |
| 2003/0069921 A1* | 4/2003 | Lamming et al. | 709/203 |
| 2003/0081008 A1 | 5/2003 | Seo | |
| 2003/0088793 A1 | 5/2003 | Parry | |
| 2003/0169299 A1 | 9/2003 | Kusano | |
| 2003/0169300 A1 | 9/2003 | Colgrove | |
| 2003/0174177 A1 | 9/2003 | Tsukuda | |
| 2004/0196499 A1* | 10/2004 | Livingston | 358/1.15 |
| 2005/0182979 A1* | 8/2005 | Gross et al. | 713/300 |
| 2005/0210408 A1* | 9/2005 | Baranda | 715/810 |
| 2005/0237564 A1* | 10/2005 | Sugimoto | 358/1.15 |

OTHER PUBLICATIONS

U.S. Appl. No. 10/805,469, filed Sep. 22, 2005, Baranda.

* cited by examiner

| 310 | Select an available setting item using GUI |

| 320 | User can use GUI to specify the setting item to be displayed (custom display of settings is the first tab in the settings menu) |

| 330 | User can use GUI to specify a value to the setting item, changing it from the factory-default value for device |

| 340 | User can use GUI to assign a profile name to a set of setting values |

| 350 | Finish customization related to the setting item |

| 910 | Select two or more setting values using GUI |

| 920 | Make an association between the setting values |

FIG. 9

```
1000  Scripting language for representing
                    associations between setting values if ( within Profile 3 )
      if ( Duplex is On )
      {
         if ( 1-up ) then ( flip on long edge )
         else
         if ( 2-up ) then ( flip on short edge )
         else
            ...
      }
```

FIG. 10

DIFFERENTIAL TREE AND DIALOG DEVICE SETTINGS MENU

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to the field of graphical user interfaces (GUI), and more particularly to providing an improved, simplified display and menu for a device.

BACKGROUND OF THE INVENTION

Device drivers are generally known, including a printer driver. Typically, printing from a computer occurs through the use of a printer driver. Upon either an application launch or during a print command load time, the application will call an instance of the printer driver and provide the user with an interface to set the desired printer driver settings. Printer driver settings may also be called printer options, print settings, driver options, printer parameters, print selections, etc. The printer driver settings specify preferences on features of the printer.

In a typical GUI (Graphical User Interface) for a device settings menu, the various settings and selections are organizing into several pages, each of which is accessible by clicking on the respective tabs. The various settings are displayed within each page corresponding to the tab. As the number of adjustable features increases, it becomes more difficult to locate the desired setting. Furthermore, having to move to different pages by clicking on the tabs is cumbersome.

The present invention arose out of the above concerns associated with providing an improved, simplified display and menu for a device.

SUMMARY OF THE INVENTION

Methods, computer program products, computing and printing systems for providing a simplified menu for a device by providing a GUI for selecting setting items for display and setting values are described.

Those settings that are different from the standard settings are displayed more prominently, resulting in a display that enables an instantaneous confirmation of the settings. Clicking on tabs to display different menu pages is unnecessary. Methods include indicating all the settings are standard, customizing factory-default settings of a printer device, assigning profile names, searching for a profile close to the current settings, differential tree that expands only the branches containing salient settings, associating a setting with another setting, and a scripting language to specify the setting combinations.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
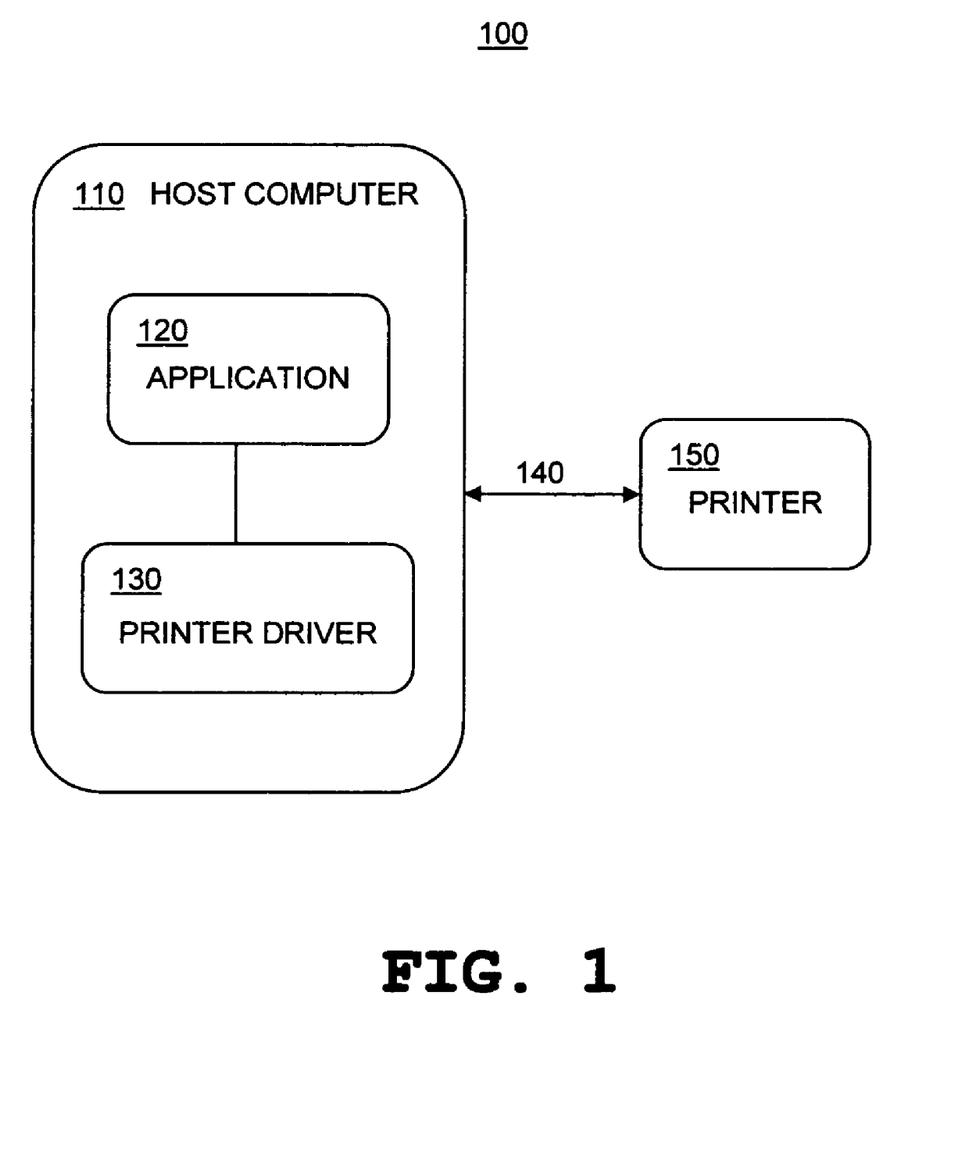
FIG. 1 is a simplified block diagram showing connection of a computing system to a printer.

FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer driver settings, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver settings, but they are to be understood as similarly applicable to other kinds of device drivers.

Figure 2:
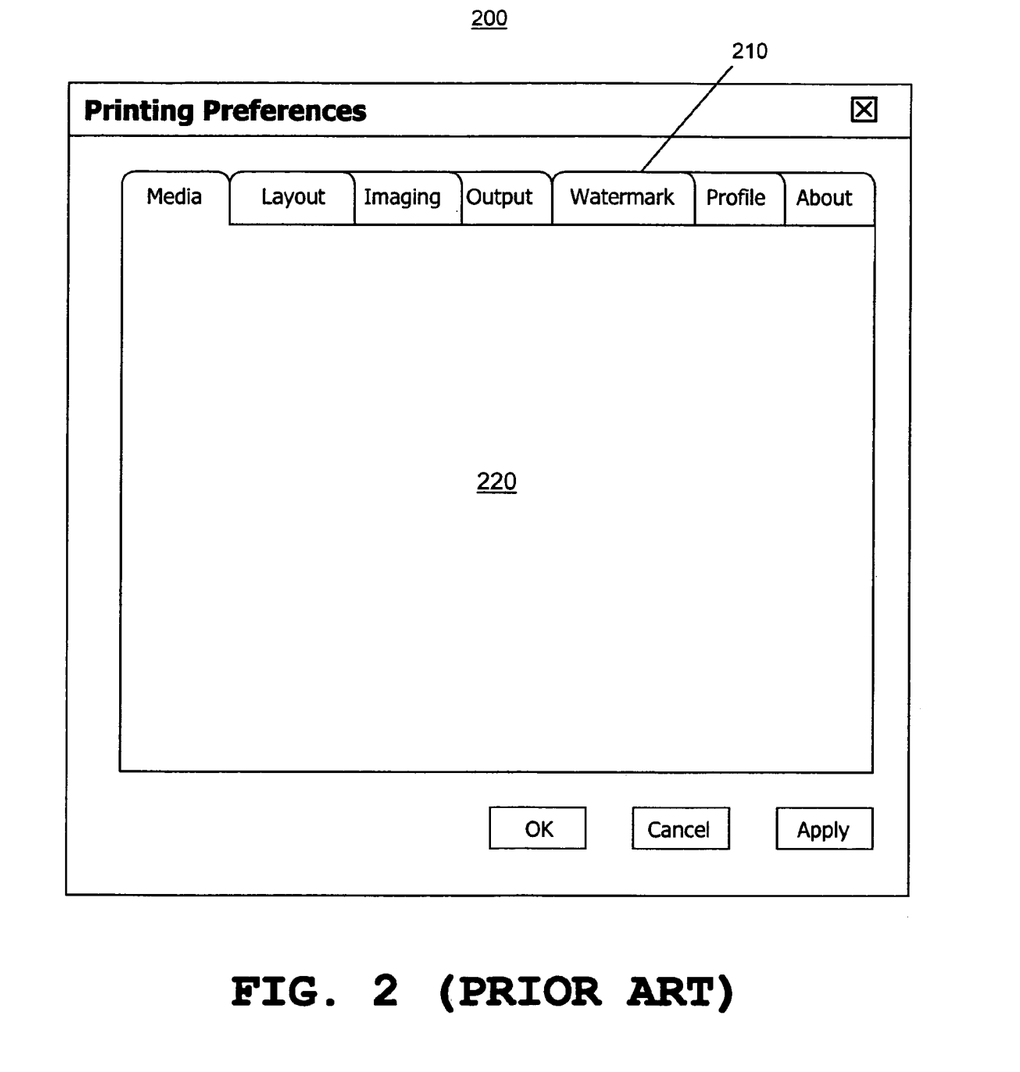
FIG. 2 is a view of the GUI (Graphical User Interface) for a prior art device driver menu with multiple tabs.

FIG. 2 is a view of the GUI (Graphical User Interface) for a prior art menu for a device. The user typically accesses this menu 200 by clicking on the "Properties" button in the print menu. Here, the various settings and selections are organizing into several pages, each of which is accessible by clicking on the respective tabs 210. The various settings 220 (not shown) are displayed within each page corresponding to the tab 210. As the number of adjustable features increases, it becomes more difficult to locate the desired setting. Furthermore, having to move to different pages by clicking on the tabs 210 is cumbersome.

Figure 3:
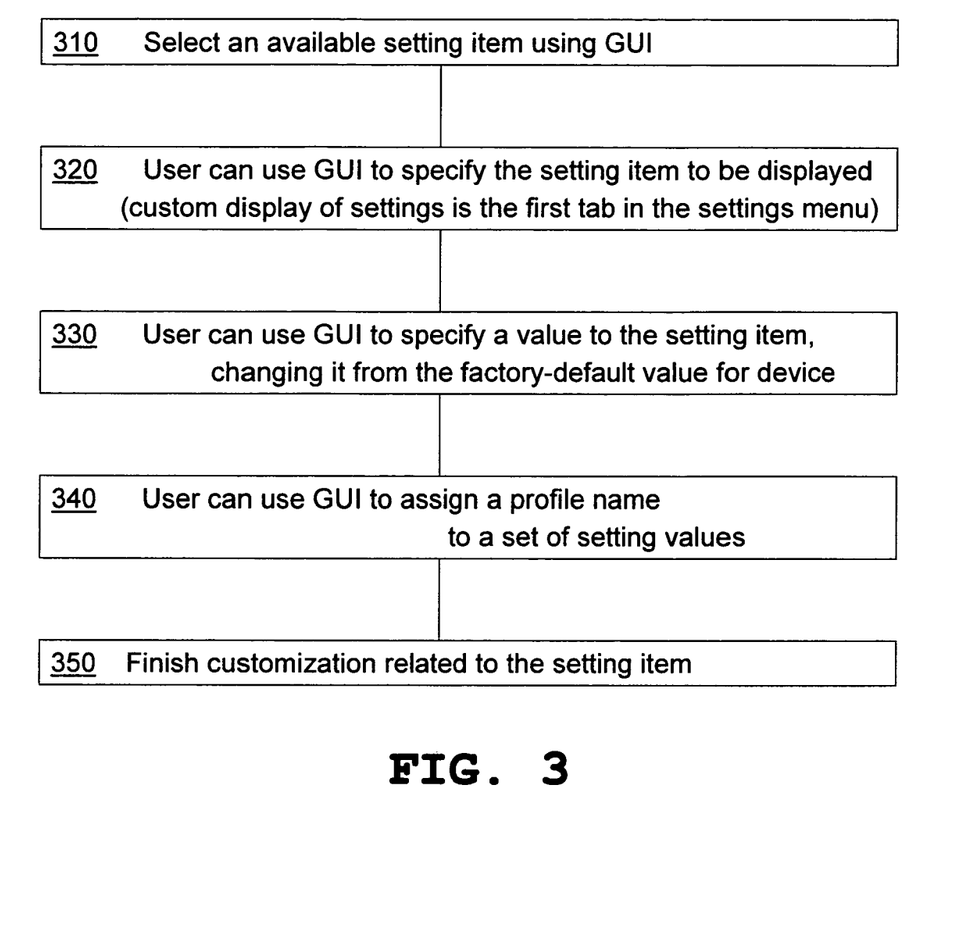
FIG. 3 is a flowchart showing selecting setting items for display, setting values, and assigning a profile name, in accordance with a preferred embodiment of the present invention.

FIG. 3 is a flowchart showing selecting setting items for display, setting values, and assigning a profile name, in accordance with a preferred embodiment of the present invention. In step 310, a user can use GUI to select a setting item from available setting items for the device. A setting item refers to one of the various selectable options, and a setting value is a value available for the setting item. For example, "On" and "Off" are setting values for the setting item "Duplex" printing. Where there is no ambiguity, "setting" is used. In step 320, the user can use GUI to specify the setting item to be displayed. By specifying the setting item to be displayed, it will be added to the menu to be displayed prominently, in a manner such as being the first tab in the menu, a tab that is displayed prominently simultaneously as the other tabs in the menu, etc. In step 330, a user can use GUI to select a setting value to the setting item, changing it from the factory-default value for the device. The value is selected by the typical GUI controls such as checkboxes, buttons, radio buttons, list boxes, combo boxes, scroll bars, push buttons, group boxes, pulldown menus 3-state buttons, trees with selectable items, etc. In step 340, the user can use GUI to assign a profile name to a set of setting values. A profile name is a nickname that the user assigns to the customized set of setting values, so that the user can easily refer to the set of setting values. In step 350, the user finishes customization related to the setting item, typically by clicking on a button labeled OK or Finish.

Figure 4:
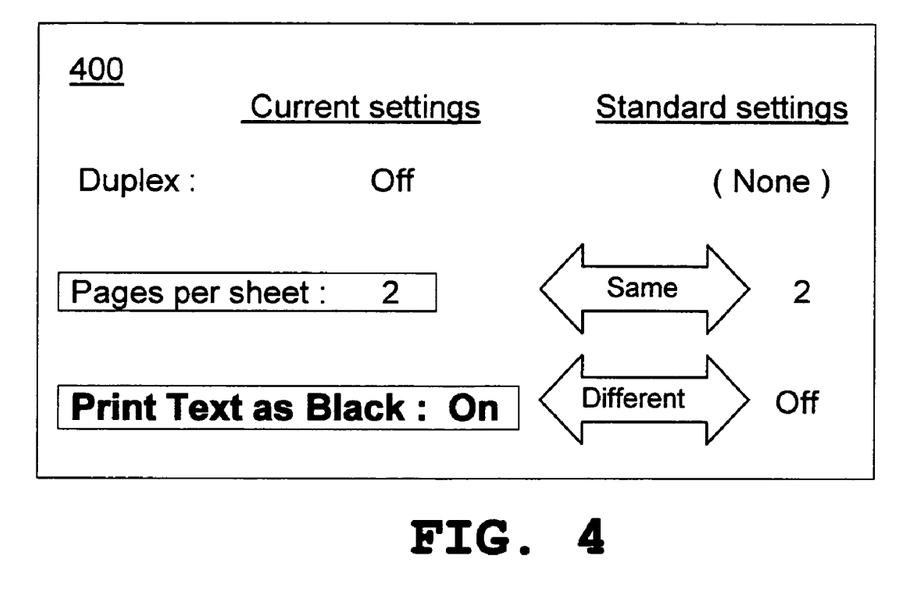
FIG. 4 is a view of the GUI showing visual distinct displays for setting values that are same and different from the standard settings, in accordance with a preferred embodiment of the present invention.

FIG. 4 is a view of the GUI showing visual distinct displays for setting values that are same and different from the standard settings, in accordance with a preferred embodiment of the present invention. This sample display includes three settings Duplex, Pages per sheet, and Print text as black. The standard settings typically defaults to the factory-default values for a device. The standard setting values can be customized by the user, when the user specifies the "standard" values. The standard setting values are typically one of the profiles specified by the user. These standard values are the values against which the current setting values are compared, and the difference prominently displayed. In this example, there is no standard value for Duplex in the standard settings. It is presumably left at the setting in the factory-default values for the device. In the standard settings, Pages per sheet is set at 2, and Print text as black is set at Off. In the current settings, Pages per sheet is set at 2, and Print text as black is set at On. In an embodiment of the present invention, the current settings are displayed in the following manner. The "Off" value of the Duplex setting is displayed in a regular manner. The "2" value of the Pages per sheet setting, which is the same as the standard value, is displayed in a first visually distinct manner. The "On" value of the Print text as black setting, which is different from the standard value, is displayed in a second visually distinct manner. This value (as well as the setting item name) is displayed prominently (for example, by using a conspicuous color such as red) to alert the user about the deviation of the standard setting value. The value that is the same as the standard value is displayed less prominently. In an embodiment of the present invention, the first visually distinct manner of display (less prominence) employs grayed-out or invisible characters. In another embodiment of the present invention, the regular manner of display also employs grayed-out or invisible characters.

Figure 5:
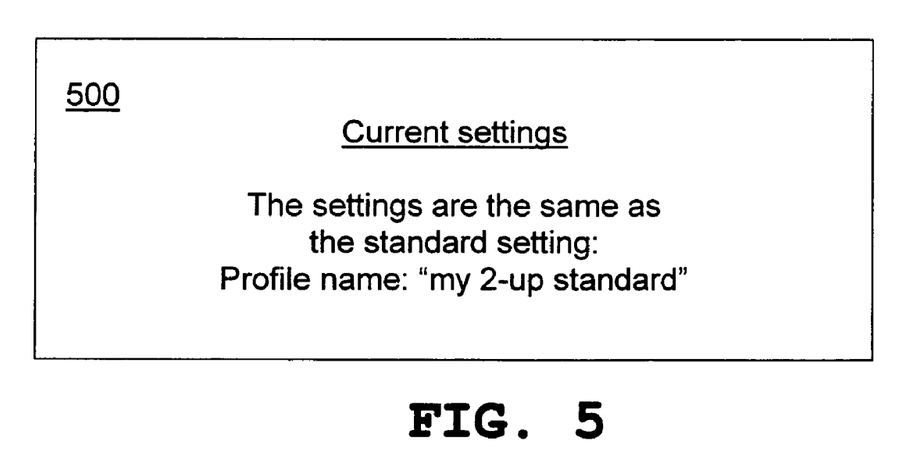
FIG. 5 is a view of the GUI indicating that all the setting values are the same as those in a profile, in accordance with a preferred embodiment of the present invention.

FIG. 5 is a view of the GUI indicating that all the setting values are the same as those in a profile, in accordance with a preferred embodiment of the present invention. In an embodiment of the present invention that employs grayed-out or invisible characters for less prominent settings, if all the settings are the same as the standard settings, the entire menu may become nearly blank. To aid the user, a message such as the following can be displayed: Current settings. The settings are the same as the standard setting: Profile name: "my 2-up standard"

Figure 6:
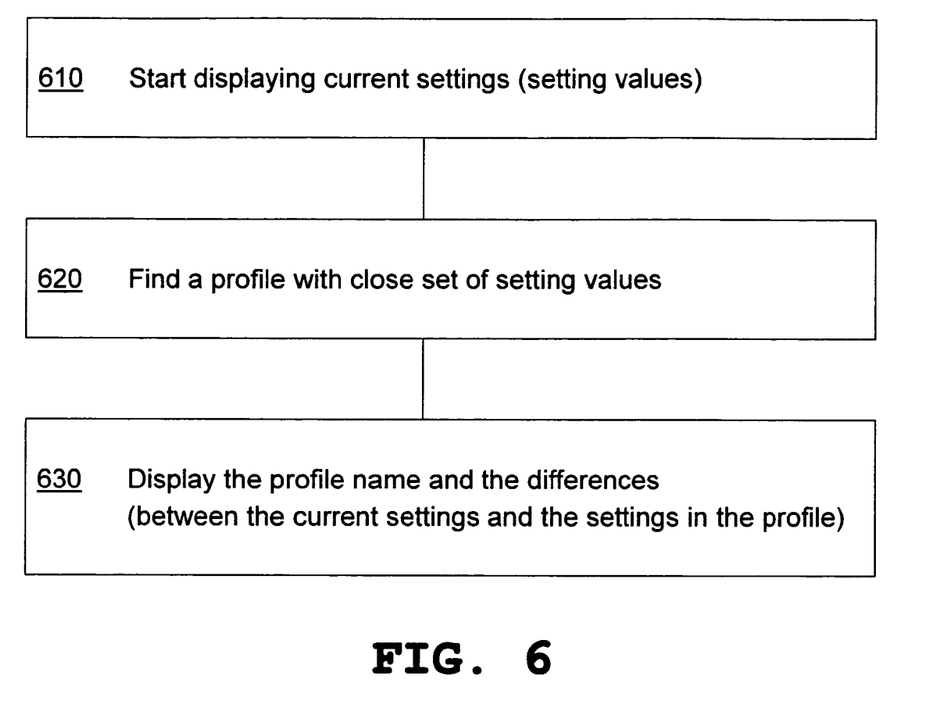
FIG. 6 is a flowchart showing display of a profile close to current settings, in accordance with a preferred embodiment of the present invention.

FIG. 6 is a flowchart showing display of a profile close to current settings, in accordance with a preferred embodiment of the present invention. This manner of display can be used when multiple profiles are defined. In step 610, display of the current settings (setting values) is started. In step 620, a profile with setting values that are close to the current setting values is found. In one embodiment of the present invention, the number of different settings is calculated for each profiles and the profile with the fewest differences is selected. In step 630, the selected profile name is displayed along with the differences (between the current settings and the settings in the profile). In one embodiment of the present invention, two or more profiles with close set of setting values are displayed.

Figure 7:
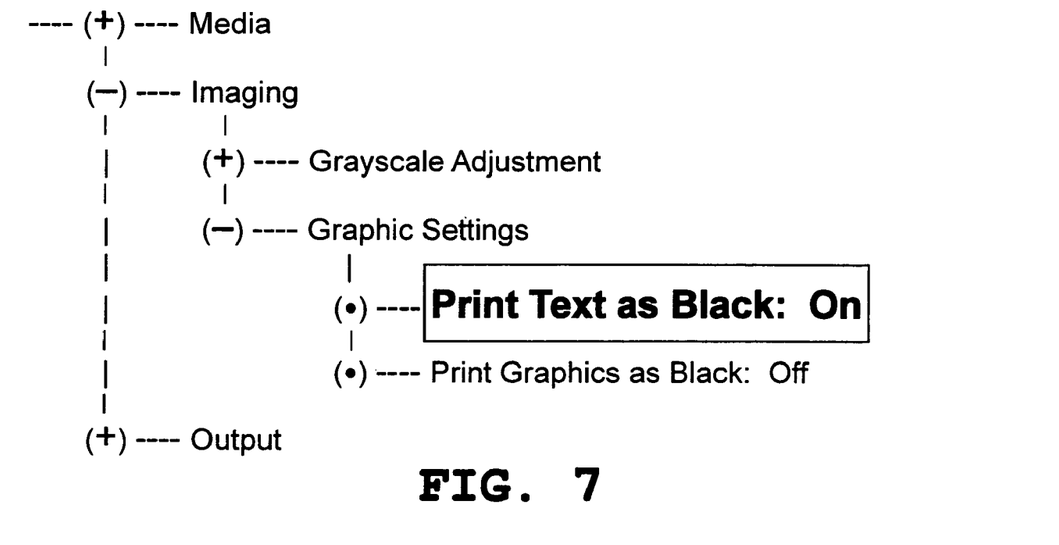
FIG. 7 is a view of the GUI of a differential tree in which a branch containing a setting value different from a standard setting is expanded, in accordance with a preferred embodiment of the present invention.

FIG. 7 is a view of the GUI of a differential tree in which a branch containing a setting value different from a standard setting is expanded, in accordance with a preferred embodiment of the present invention. This sample display includes two settings Print text as black and Print graphics as black. Similarly to the dialog box format of FIG. 4, in a differential tree, the standard values are the values against which the current setting values are compared, and the difference prominently displayed. In the standard settings, both Print text as black and Print graphics as black are set at Off. In the current settings, Print text as black is set at On and Print graphics as black is off. In an embodiment of the present invention, the current settings are displayed in the following manner. The "On" value of the Print text as black setting, which is different from the standard value, is displayed in a visually prominent manner. This value (as well as the setting item name) is displayed prominently (for example, by using a conspicuous color such as red) to alert the user about the deviation of the standard setting value. The value that is the same as the standard value is displayed less prominently.

This differential tree is made up of branches and nodes. At the topmost level there are three branches labeled Media, Imaging, and Output. The two settings are displayed as nodes or terminal nodes labeled Print text as black and Print graphics as black. In an embodiment of the present invention, only branches containing a setting value different from a standard setting values are expanded. In this case, only the Imaging branch and the Graphic settings sub-branch are expanded. In another embodiment of the present invention, branches can be expanded and reduced by clicking on the + and − buttons. In another embodiment of the present invention, clicking on the branches and nodes enables display of help files and setting changes.

Figure 8:
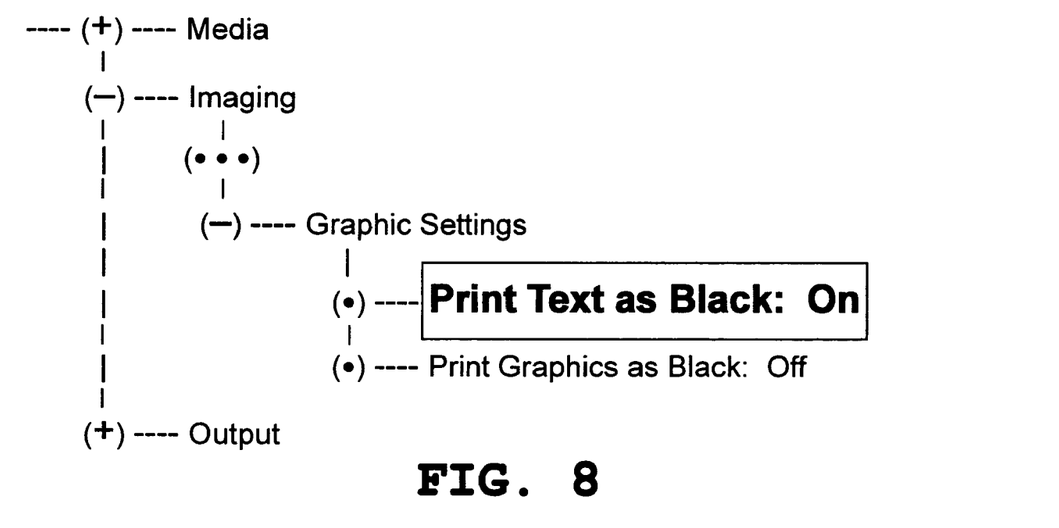
FIG. 8 is a view of the GUI of a differential tree in which a branch containing a setting value different from a standard setting is expanded, and in which branches are abbreviated, in accordance with a preferred embodiment of the present invention.

FIG. 8 is a view of the GUI of a differential tree in which a branch containing a setting value different from a standard setting is expanded, and in which branches are abbreviated, in accordance with a preferred embodiment of the present invention. The displayed, standard, and current settings are the same as in the last figure. This sample display shows abbreviation of sub-branches containing no settings with values that are different from the standard values. The sub-branch labeled "Grayscale Adjustment" is replaced with the abbreviation marker "(● ● ●)" resulting in a more concise tree. In an embodiment of the present invention, another adjacent sub-branches containing no settings with values that are different from the standard values is subsumed by the first abbreviation marker, rather than its own abbreviation marker. In another embodiment of the present invention, the components that are displayed in a visually less prominent manner are shown as grayed-out or invisible.

Figure 9:
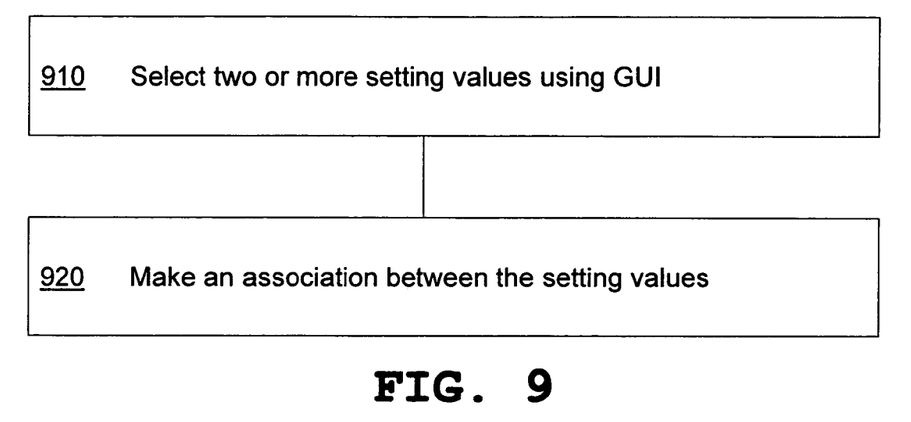
FIG. 9 is a flowchart showing how a user can associate a setting value with another setting value, in accordance with a preferred embodiment of the present invention.

FIG. 9 is a flowchart showing how a user can associate a setting value with another setting value, in accordance with a preferred embodiment of the present invention. In step 910, a user uses GUI to select two or ore setting values that are to be associated. In step 920 the user uses GUI to make an association between the selected setting values. An example of such an association is given below.

Figure 10:
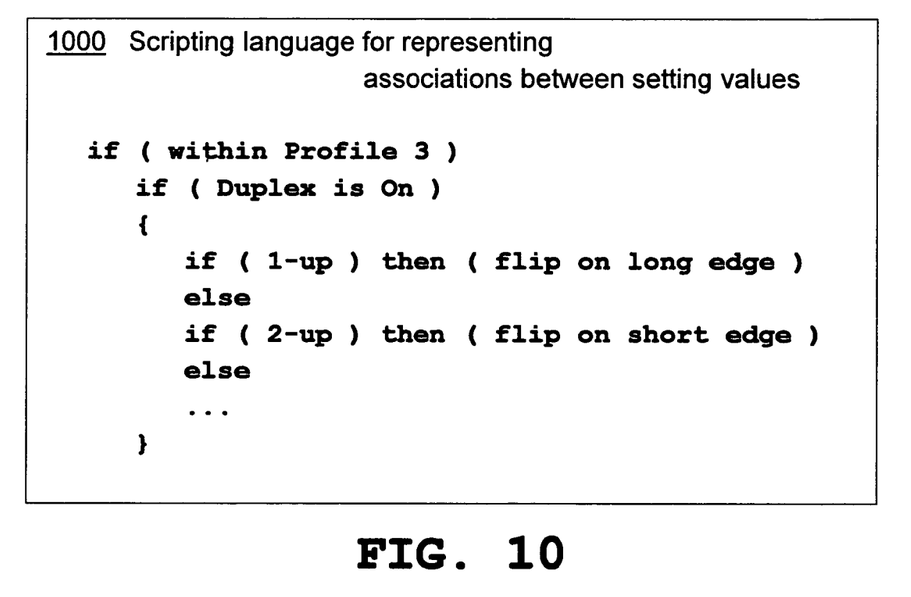
FIG. 10 is a view of sample scripting language for specifying association rules between setting values, in accordance with a preferred embodiment of the present invention.

FIG. 10 is a view of sample scripting language for specifying association rules between setting values, in accordance with a preferred embodiment of the present invention. A user may specify the following sample association between the setting values. When Duplex printing is used to print on both sides of a sheet, the orientation of flipping can be along the long edge or the short edge. The user may specify long-edge flipping for 1-up printing and short-edge flipping for 2-up printing. (2-up printing is printing two shrunken pages on a side of a sheet). In an embodiment of the present invention, the user specifies this association using GUI, and the association is stored internally using a script language shown in FIG. 10. This script-language representation can then be shared with other users or distributed. In another embodiment of the present invention, the user specifies this association directly using the script-language representation. This script-language representation can take other, equivalent forms, such as XML, more compact representations, or more natural-language-like representations.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention. The invention may be implemented as a computer process, a computing system, or as an article of manufacture such as a computer program product.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for providing a menu for a device, comprising providing a graphical user interface (GUI) by which a user selects a set of at least one pair of standard setting item and value as a separate step from at least one subsequent request for displaying of current settings, and after having selected a set of at least one pair of standard setting item and value, until the user selects a new set of at least one pair of standard setting item and value, the user intends at least one subsequent request for displaying of current settings to result in displaying only the difference in values between the current settings and the set of at least one pair of standard setting item and value;

providing a GUI for selecting and specifying prominent display of a set of at least one setting from available setting items for the device, wherein the prominent display comprises a first tab in the menu and a tab that is displayed prominently simultaneously as the other tabs in the menu; and upon a user's request to display current settings, displaying at least one current setting item and value, wherein a setting value that is the same as a standard setting value is displayed in a first visually distinct manner and a setting value that is different from a standard setting value is displayed in a second visually distinct manner, wherein the at least one current setting item and value is displayed in a first tab of the menu comprising at least one tab; and wherein after the user's selecting of a set of at least one pair of standard setting item and value, and before a user's request to display current settings, there is at least one change operation upon a setting value for the device, and, the at least one change operations upon the setting value for the device, by changing the current setting value, affects and determines the choice of manner of display from the first and the second visually distinct manners of the current setting value, if the current setting value is to be displayed.

2. The method of claim 1, wherein upon determining that all current setting values are the same as standard setting values,
the fact that all current setting values are the same as standard setting values is prominently displayed by a descriptive text.

3. The method of claim 1, wherein a standard setting value is a user-customizable, factory-default setting value of a printing device.

4. The method of claim 1, wherein a setting item is displayed in a differential tree in which a branch containing a setting value different from a standard setting value is expanded.

5. The method of claim 1, wherein multiple profiles are defined, and
upon a user's request to display current settings,
a profile with setting values that are close to the current setting values is found, and the profile's name is displayed together with differences between the settings to which the profile name is assigned and the current setting values.

6. The method of claim 1, further comprising GUI for associating a setting value with another setting value, so that a change to a specified setting value causes a change to another setting value of the associated setting.

7. The method of claim 6, wherein the associating of a setting value with another setting value is represented using a scripting language.

8. A computer program product stored on a computer for providing a menu for a device, comprising machine-readable code for causing the computer to perform the method step of:
providing a graphical user interface (GUI) by which a user selects a set of at least one pair of standard setting item and value as a separate step from at least one subsequent request for displaying of current settings, and after having selected a set of at least one pair of standard setting item and value, until the user selects a new set of at least one pair of standard setting item and value, the user intends at least one subsequent request for displaying of current settings to result in displaying only the difference in values between the current settings and the
set of at least one pair of standard setting item and value;
providing a GUI for selecting and specifying prominent display of a set of at least one setting from available setting items for the device, wherein the prominent display comprises a first tab in the menu and a tab that is displayed prominently simultaneously as the other tabs in the menu; and upon a user's request to display current settings, displaying at least one current setting item and value, wherein a setting value that is the same as a standard setting value is displayed in a first visually distinct manner and a setting value that is different from a standard setting value is displayed in a second visually distinct manner, wherein the at least one current setting item and value is displayed in a first tab of the menu comprising at least one tab; and wherein after the user's selecting of a set of at least one pair of standard setting item and value, and before a user's request to display current settings, there is at least one change operation upon a setting value for the device, and the at least one change operations upon the setting value for the device, by changing the current setting value, affects and determines the choice of manner of display from the first and the second visually distinct manners of the current setting value, if the current setting value is to be displayed.

9. The computer program product of claim 8, wherein upon determining that all current setting values are the same as standard setting values, the fact that all current setting values are the same as standard setting values is prominently displayed by a descriptive text.

10. The computer program product of claim 8, wherein a standard setting value is a user-customizable, factory-default setting value of a printing device.

11. The computer program product of claim 8, wherein a setting item is displayed in a differential tree in which a branch containing a setting value different from a standard setting value is expanded.

12. The computer program product of claim 8, wherein multiple profiles are defined, and
upon a user's request to display current settings,
a profile with setting values that are close to the current setting values is found, and the profile's name is displayed together with differences between the settings to which the profile name is assigned and the current setting values.

13. The computer program product of claim 8, further comprising machine-readable code for causing a machine to provide a GUI for associating a setting value with another setting value, so that a change to a specified setting value causes a change to another setting value of the associated setting, wherein the associating of a setting value with another setting value is represented using a scripting language.

14. A computing system, comprising a processor, a device driver programmed to provide a menu for a device, comprising providing a graphical user interface (GUI) by which a user selects a set of at least one pair of standard setting item and value as a separate step from at least one subsequent request for displaying of current settings, and after having selected a set of at least one pair of standard setting item and value, until the user selects a new set of at least one pair of standard setting item and value, the user intends at least one subsequent request for displaying of current settings to result in displaying only the difference in values between the current settings and the set of at least one pair of standard setting item and value;
providing a GUI for selecting and specifying prominent display of a set of at least one setting from available setting items for the device, wherein the prominent display comprises a first tab in the menu and a tab that is displayed prominently simultaneously as the other tabs in the menu; and upon a user's request to display current settings, displaying at least one current setting item and value, wherein a setting value that is the same as a standard setting value is displayed in a first visually distinct manner and a setting value that is different from a standard setting value is displayed in a second visually distinct manner, wherein the at least one current setting item and value is displayed in a first tab of the menu comprising at least one tab; and wherein after the user's selecting of a set of at least one pair of standard setting item and value, and before a user's request to display current settings, there is at least one change operation upon a setting value for the device, and the at least one change operations upon the setting value for the device, by changing the current setting value, affects and determines the choice of manner of display from the first and the second visually distinct manners of the current setting value, if the current setting value is to be displayed.

15. The computing system of claim 14, wherein upon determining that all current setting values are the same as standard setting values, the fact that all current setting values are the same as standard setting values is prominently displayed by a descriptive text.

16. The computing system of claim 14, further comprising a print engine, wherein a standard setting value is a user-customizable, factory-default setting value of a printing device.

17. The computing system of claim 14, wherein a setting item is displayed in a differential tree in which a branch containing a setting value different from a standard setting value is expanded.

18. The computing system of claim 14, wherein multiple profiles are defined, and upon a user's request to display current settings, a profile with setting values that are close to the current setting values is found, and the profile's name is displayed together with differences between the settings to which the profile name is assigned and the current setting values.

19. The computing system of claim 14, further comprising a GUI for associating a setting value with another setting value, so that a change to a specified setting value causes a change to another setting value of the associated setting, wherein the associating of a setting value with another setting value is represented using a scripting language.

* * * * *